(12) United States Patent
Kim

(10) Patent No.: US 6,442,500 B1
(45) Date of Patent: Aug. 27, 2002

(54) DEVICES FOR CONTROLLING TEMPERATURE INDICATIONS IN INTEGRATED CIRCUITS USING ADJUSTABLE THRESHOLD TEMPERATURES

(75) Inventor: Jong-sun Kim, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/359,438

(22) Filed: Jul. 22, 1999

(30) Foreign Application Priority Data

Aug. 8, 1998 (KR) .............................. 98-32294

(51) Int. Cl.$^7$ ................................. G01K 1/08
(52) U.S. Cl. ............. 702/132; 374/101; 702/FOR 142; 702/130
(58) Field of Search ................. 702/99, 120, 130, 702/132, 136, FOR 106, FOR 142; 361/158, 274.1; 714/733; 374/101, 141, 178, 183

(56) References Cited

U.S. PATENT DOCUMENTS

| | | | | |
|---|---|---|---|---|
| 5,085,526 A | * | 2/1992 | Sawtell et al. | 374/101 |
| 5,119,265 A | * | 6/1992 | Qualich et al. | 361/103 |
| 5,159,520 A | * | 10/1992 | Toyooka et al. | 361/103 |
| 5,379,230 A | | 1/1995 | Morikawa et al. | 364/483 |
| 5,422,832 A | * | 6/1995 | Moyal | 702/FOR 142 |
| 5,485,127 A | * | 1/1996 | Bertoluzzi et al. | 331/69 |
| 5,490,059 A | * | 2/1996 | Mahalingaiah et al. | 702/130 |
| 5,890,100 A | * | 3/1999 | Crayford | 702/130 |
| 6,006,169 A | * | 12/1999 | Sandhu et al. | 702/132 |

FOREIGN PATENT DOCUMENTS

WO    WO 97/14092    4/1997

OTHER PUBLICATIONS

Notice to Submit Response, Korean Application No. 10–1998–0032294, Oct. 25, 2000.

* cited by examiner

Primary Examiner—John S. Hilten
Assistant Examiner—John Le
(74) Attorney, Agent, or Firm—Myers Bigel Sibley & Sajovec

(57) ABSTRACT

A temperature condition indicator in a fabricated integrated circuit provides first and second voltage signals that vary with the temperature of the fabricated integrated circuit. The first voltage signal increases as the temperature of the fabricated integrated circuit increases and decreases as the temperature of the fabricated integrated circuit decreases. The second voltage signal decreases as the temperature of the fabricated integrated circuit increases and increases as the temperature of the fabricated integrated circuit decreases. The first and second voltage signals are about equal (or intersect) when the temperature of the fabricated integrated circuit is about equal to a first temperature. The first temperature is selected to correspond to a temperature out of range condition. The intersection of the first and second voltage signals may thereby indicate a threshold temperature for the operation of the fabricated integrated circuit. If a first temperature out of range condition occurs at about T degrees, the first and second voltage signals are controlled so that the intersection of the first and second voltage signals is about equal to a voltage level that corresponds to about the threshold temperature. The levels of the first and second voltage signals can be shifted to adjust the intersection of the first and second voltage signals so that the threshold temperature can be adjusted.

9 Claims, 5 Drawing Sheets

(a)

(b)

DEVICES FOR CONTROLLING TEMPERATURE INDICATIONS IN INTEGRATED CIRCUITS USING ADJUSTABLE THRESHOLD TEMPERATURES

FIELD OF THE INVENTION

The present invention relates to the field of integrated circuits in general and more particularly to the operation of integrated circuits.

BACKGROUND OF THE INVENTION

Integrated circuits, such as semiconductor memories, may need close timing control over a range of operational temperatures to function properly. Unfortunately, integrated circuits may not function properly when the temperatures to which the integrated circuits are exposed are beyond the range of operational temperatures. Moreover, a system that includes the integrated circuits subjected to such temperatures may not function properly.

It is known to include a temperature sensor in integrated circuits for detecting temperatures beyond the range of operational temperatures to which the integrated circuits are subjected. For example, a conventional temperature sensor may detect when the temperature to which an integrated circuit is exposed exceeds a predetermined threshold temperature (an outside temperature range condition). An indication may be provided to the system based on the outside temperature range condition, such as by switching an output of the integrated circuit from one logic state to another.

It is known to select the predetermined threshold temperature during the fabrication of the integrated circuit. Unfortunately, it may be difficult to change the threshold at which the conventional temperature sensor indicates a temperature out of range condition after the integrated circuit is fabricated. Therefore, a need exists for improved temperature sensors in integrated circuits.

SUMMARY OF THE INVENTION

It is, therefore, an object of the present invention to allow improvement in the operation of fabricated integrated circuits.

It is a further object of the present invention to allow improved indications of temperature states of fabricated integrated circuits.

These and other objects are provided by temperature condition indicators and methods that provide a temperature state of a fabricated integrated circuit based on a temperature of the fabricated integrated circuit relative to a variable threshold temperature, wherein the variable threshold temperature can be adjusted during the operation of the fabricated integrated circuit. According to the present invention, a means for determining a temperature state of the fabricated integrated circuit is based on a temperature of the fabricated integrated circuit relative to a variable threshold temperature. A means for indicating the temperature state of the fabricated integrated circuit relative to the variable threshold temperature is adjusted during operation of the fabricated integrated circuit. For example, the threshold temperature can correspond to a temperature out of range condition beyond which the fabricated integrated circuit may not operate. The threshold temperature can be adjusted after the integrated circuit is packaged, by MRS mode, test mode or an electrical fuse, etc.

These and other objects are provided by temperature condition indicators and methods that provide a temperature state of a fabricated integrated circuit based on a temperature of the fabricated integrated circuit relative to a variable threshold temperature, wherein the variable threshold temperature can be adjusted during the operation of the fabricated integrated circuit. According to the present invention, a means for determining a temperature state of the fabricated integrated circuit is based on a temperature of the fabricated integrated circuit relative to a variable threshold temperature. A means for indicating the temperature state of the fabricated integrated circuit relative to the variable threshold temperature is adjusted during operation of the fabricated integrated circuit. For example, the threshold temperature can correspond to a temperature out of range condition beyond which the fabricated integrated circuit may not operate. The threshold temperature can be adjusted after the integrated circuit is packaged, by a tetode or an electrical fuse, etc.

In another aspect of the present invention, the temperature condition indicator includes a first current source which sources a first current based on the temperature in the fabricated integrated circuit. A second current source sources a second current based on the temperature in the fabricated integrated circuit wherein the temperature condition indicator provides the temperature state of the fabricated integrated circuit based on the first and second currents.

DETAILED DESCRIPTION OF THE INVENTION

The present invention now will be described more fully hereinafter with reference to the accompanying drawings, in which preferred embodiments of the invention are shown. This invention may, however, by embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
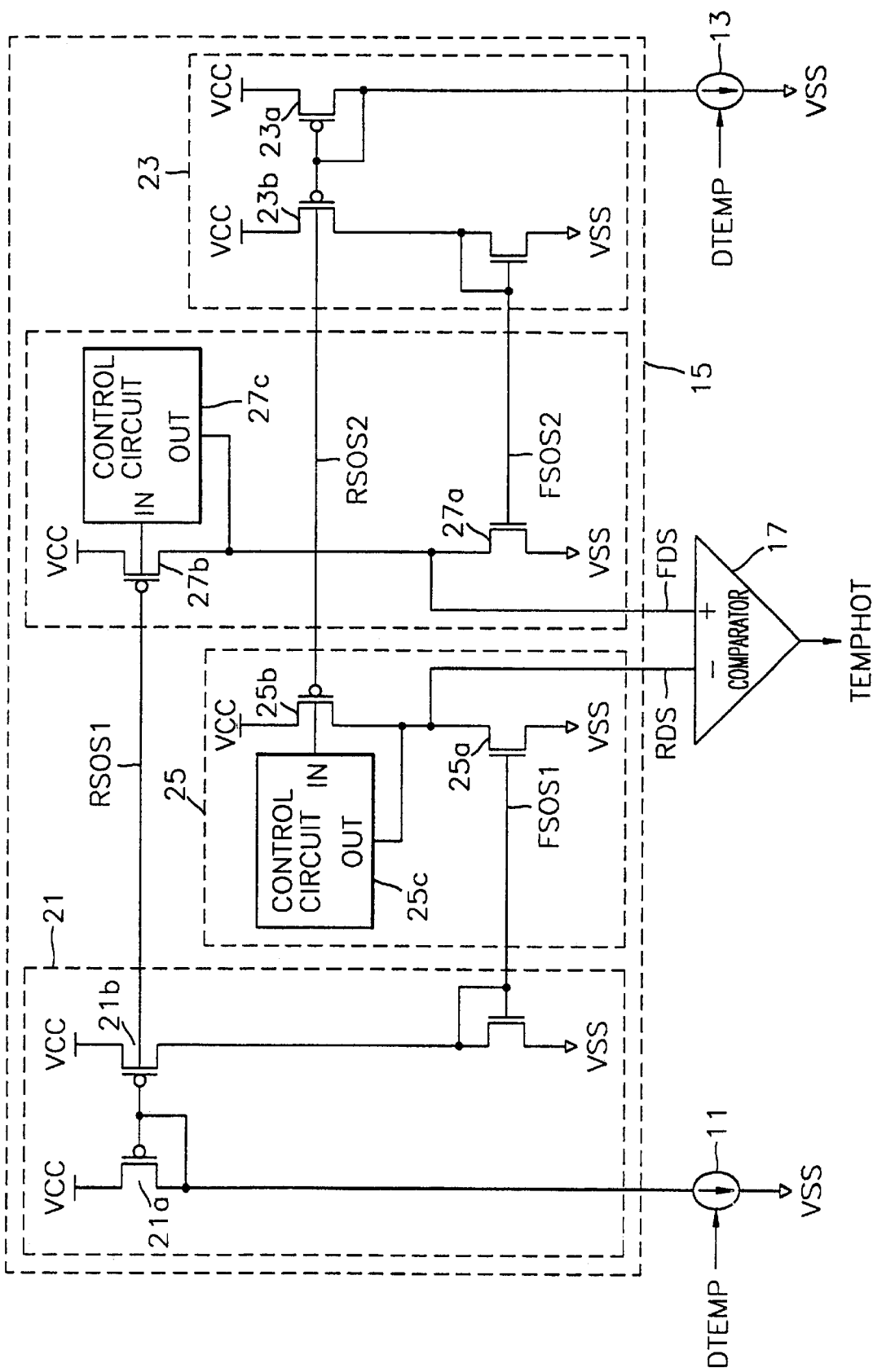
FIG. 1 is a circuit diagram of a temperature condition indicator according to an embodiment of the present invention.

FIG. 1 is a circuit diagram of a temperature condition indicator according to an embodiment of the present invention. Referring to FIG. 1, the temperature condition indicator includes a forward current source 11, a reverse current source 13, and programmable temperature detector 15 and a comparator 17. According to the present invention, a temperature of a fabricated integrated circuit is used to provide first and second voltage signals that vary with the temperature of the fabricated integrated circuit. The first voltage signal increases as the temperature of the fabricated integrated circuit increases and decreases as the temperature of the fabricated integrated circuit decreases. The second voltage signal decreases as the temperature of the fabricated integrated circuit increases and increases as the temperature of the fabricated integrated circuit decreases.

The first and second voltage signals are about equal (or intersect) when the temperature of the fabricated integrated circuit is about equal to a first temperature. The first temperature is selected to correspond to a temperature out of range condition (threshold temperature). The intersection of the first and second voltage signals may thereby indicate a threshold temperature for the operation of the fabricated integrated circuit. For example, if a first temperature out of range condition occurs at about T degrees, the first and second voltage signals are controlled so that the intersection of the first and second voltage signals is about equal to a voltage level that corresponds to about T degrees (the threshold temperature).

Referring to FIG. 1, the forward current source 11 sources a first current which increases in response to the amount of current according to an increase in a temperature of the integrated circuit DTEMP. The reverse current source 13 sources a second current which decreases in response to an increase in DTEMP. The programmable temperature detector 15 generates a forward detection signal FDS and a reverse detection signal RDS whose voltage levels are determined by the first current source by the forward current source 11 and the second current source by reverse current source 13, respectively.

The voltage level of the forward detection signal FDS increases as the amount of current sourced by the forward current source 11 increases, and decreases as the amount of current sourced by the reverse current source 13 increases. Thus, the voltage level of the forward detection signal FDS increases as the temperature DTEMP increases.

The voltage level of the reverse detection signal RDS decreases as the first current sourced by the forward current source 11 increases, and increases as the second current sourced by the reverse current source 13 decreases. Thus, the voltage level of the reverse detection signal RDS decreases as the temperature DTEMP increases. As DTEMP approaches a threshold temperature, the voltage level of the forward detection signal FDS and the reverse detection signal RDS become equal.

The comparator 17 compares the respective voltage levels of the forward detection signal FDS and the reverse detection signal RDS and generates a temperature state signal TEMPHOT of the integrated circuit. Preferably, the reverse detection signal RDS is coupled to inverted input port (−) of the comparator 17 and the forward detection signal FDS is coupled to the non-inverted input port (+) of the comparator 17. Therefore, the temperature state signal TEMPHOT is at a logic low level when DTEMP is lower than the threshold temperature and is at a logic high level when DTEMP is higher than the threshold temperature.

The programmable temperature detector 15 includes a first current mirror 21, a second current mirror 23, a first responding portion 25 and a second responding portion 27. The first current mirror 21 generates a first forward voltage signal FSOS1 and a first reverse voltage signal RSOS1 in response to the amount of current sourced by the forward current source 11. When the current sourced by the forward current source 11 increases due to a rise in the temperature DTEMP, the voltage level of the first reverse voltage signal RSOS1 decreases and the amount of current flowing in a p-type metal oxide semiconductor (PMOS) transistor 21a increases.

When the amount of current flowing in the PMOS transistor 21a increases, the amount of current flowing in a PMOS transistor 21b mirrored by the PMOS transistor 21a increases accordingly. Thus, if the amount of current sourced by the forward current source 11 increases, the level of the first forward voltage signal FSOS1 increases. When the amount of current flowing in the PMOS transistor 21a decreases, the voltage level of the first reverse voltage signal RSOS1 increases and the voltage level of the first forward voltage signal FSOS1 decreases.

The second current mirror 23 generates a second forward voltage signal FSOS2 and a second reverse voltage signal RSOS2 in response to the amount of current sourced by the reverse current source 13. When the amount of current sourced by the reverse current source 13 decreases due to a rise in the temperature DTEMP, the second reverse voltage signal RSOS2 increases and the amount of current flowing in a PMOS transistor 23a decreases.

When the amount of current flowing in the PMOS transistor 23a decreases, the amount of current flowing in a PMOS transistor 23b mirrored by the PMOS transistor 23a decreases accordingly. Thus, if the amount of current sourced by the reverse current source 13 decreases, the level of the second forward voltage signal FSOS2 decreases. When the amount of current flowing in the PMOS transistor 23a increases, the level of the second reverse voltage signal RSOS2 decreases and the level of the second forward voltage signal FSOS2 increases.

The first responding portion 25 generates the reverse detection signal RDS in response to the first forward voltage signal FSOS1 and the second reverse voltage signal RSOS2. When the level of the first forward voltage signal FSOS1 increases due to a rise in the temperature DTEMP, the amount of current flowing through a pull-down transistor 25a to ground VSS increases. When the level of the second reverse voltage signal RSOS2 increases due to a rise in the temperature DTEMP, the amount of current flowing through a pull-up transistor 25b from a power supply voltage (VCC) decreases. Thus, when the temperature DTEMP rises, the level of the reverse detection signal RDS decreases.

When the amount of current sourced by the reverse current source 13 increases and the level of the second reverse voltage signal RSOS2 decreases due to a decrease in the temperature DTEMP, the amount of current flowing through the pull-up transistor 25b from VCC increases. Also, when the level of the first forward voltage signal FSOS1 decreases due to a decrease in the temperature DTEMP, the amount of current flowing through the pull-down transistor 25a from the reverse detection signal port to the ground voltage port decreases. Thus, if the temperature DTEMP decreases, the level of the reverse detection signal RDS increases.

Figure 5:
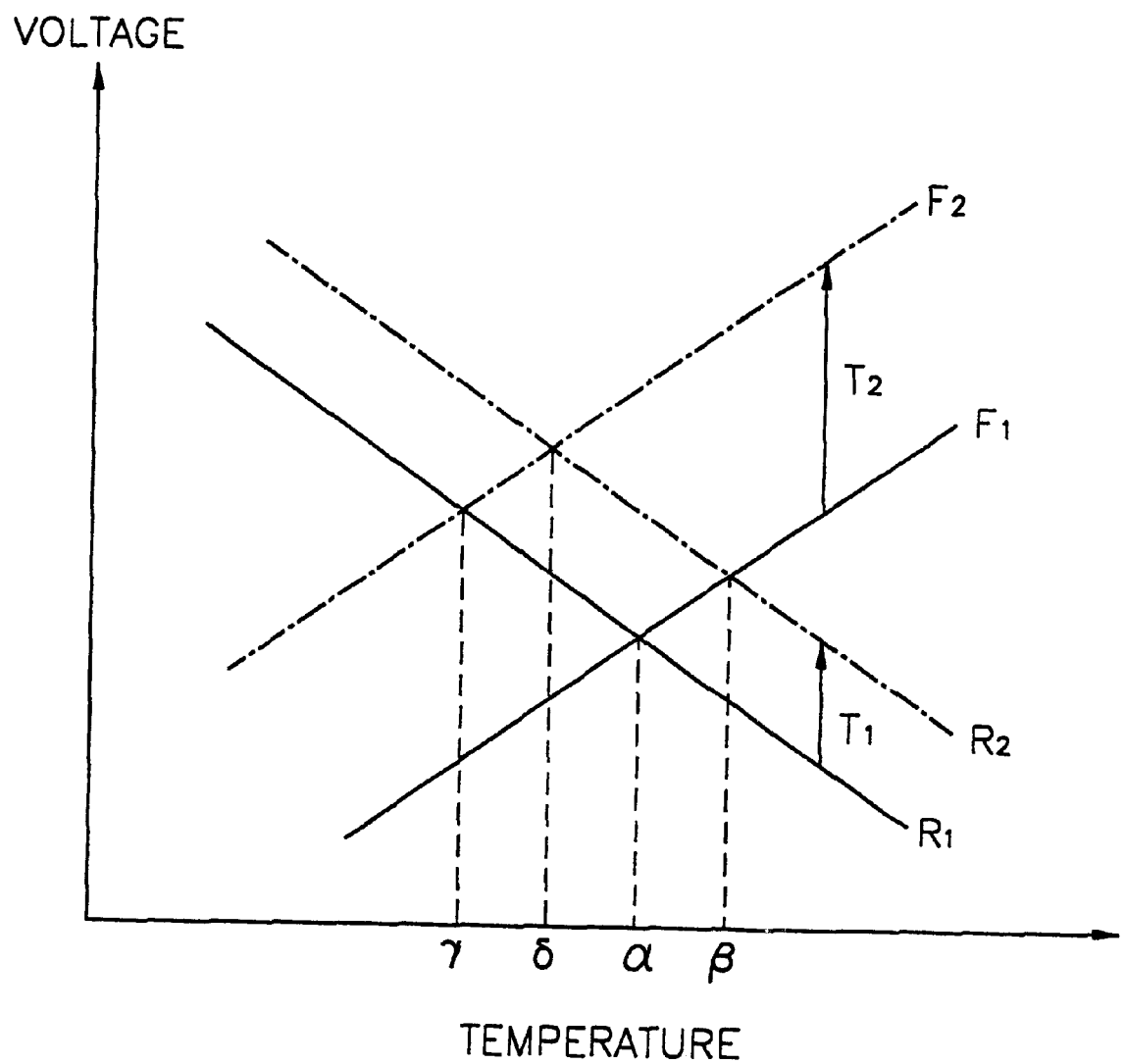
FIG. 5 is a graph that illustrates the adjustment of threshold temperatures according to the present invention.

The control circuit 25c drives the reverse detection signal using current from the power supply VCC in response to a decrease in the level of the second reverse voltage signal RSOS2, thereby increasing the level by a first magnitude (T1 of FIG. 5). The first magnitude T1 can be adjusted after or during fabrication of the integrated circuit.

The second responding circuit 27 generates the forward detection signal FDS in response to the second forward voltage signal FSOS2 and the first reverse voltage signal RSOS1. When the amount of current sourced by the second current source 13 increases and the level of the second forward voltage signal FSOS2 increases due to a decrease in the temperature DTEMP, the amount of current flowing through the pull-down transistor 27a to the ground VSS increases. When the level of the first reverse voltage signal RSOS1 increases due to a decrease in the temperature DTEMP, the amount of current flowing through the pull-up transistor 27b from the power supply voltage VCC decreases. Thus, when the temperature DTEMP decreases, the level of the forward detection signal decreases.

When the amount of current sourced by the forward current source 11 increases and the level of the first reverse voltage signal RSOS1 decreases due to an increase in the temperature DTEMP, the amount of current flowing through the pull-up transistor 27b increases. When the level of the second forward voltage signal FSOS2 decreases due to increase in the detected temperature DTEMP, the amount of current flowing through the pull-down transistor 27a decreases. Thus, when the temperature DTEMP increases, the level of the forward detection signal FDS increases.

The control circuit 27c provides current from the power supply voltage VCC to the forward detection signal port in response to a decrease in the level of the first reverse voltage signal RSOS1, thereby increasing the level by a second magnitude (T2 of FIG. 5). The second magnitude T2 can be adjusted after or during fabrication of the integrated circuit.

Figure 2:
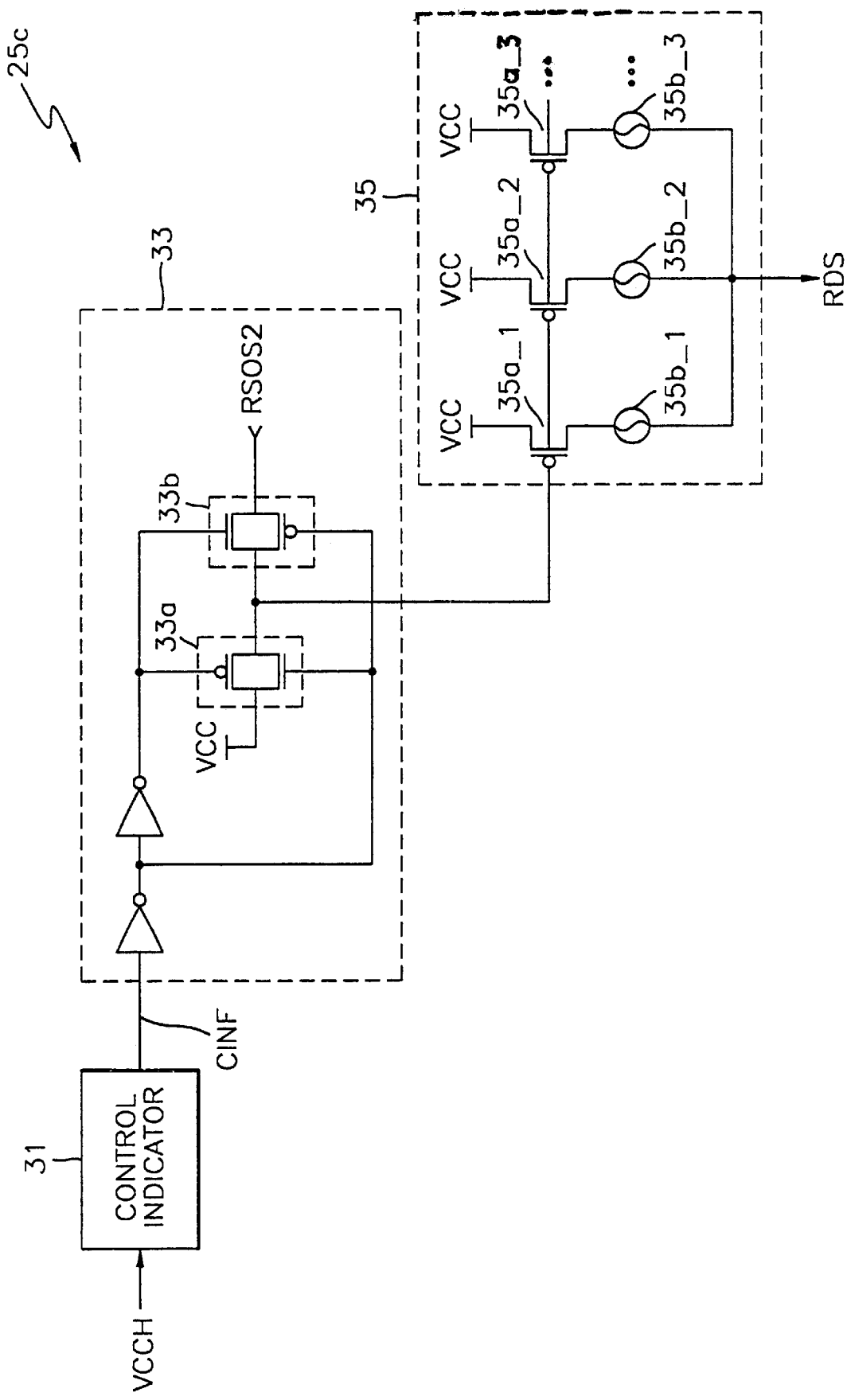
FIG. 2 is a circuit diagram of an embodiment of a control circuit shown in FIG. 1.

FIG. 2 is a circuit schematic of control circuit 25c shown in FIG. 1. It will be understood that the control circuit 27c operates in a fashion analogous to that of control circuit 25c. The controlling circuit 25c includes a control indicator 31, a multiplexer 33 and a controller 35. The control indicator 31 provides a control indication signal CINF to the multiplexer 33 which selects a signal to be applied to the controller 35. According to the present invention, the control circuit 25c is used to adjust magnitudes of shifts in the forward and reverse voltage signals to adjust the threshold temperature of the fabricated integrated circuit. In particular, the control indicator 31 controls whether the voltage level of the reverse detection signal RDS is shifted to adjust the threshold temperature. When the control indicator 31 controls the reverse voltage detection signal RDS, a shift of magnitude T is added to the reverse detection signal RDS by the controller 35. When the control indicator 31 does not control the reverse detection signal RDS. a shift is not added to the reverse detection signal RDS by the controller 35. The threshold temperature can be adjusted after the integrated circuit is fabricated. For example, after fabricating the fuses 35b_1, 35b_2, 35b__3, etc. can be reconfigured to provide a different magnitude, thereby shifting the reverse detection signal and provides a different threshold temperature beyond which a temperature out of range condition can be indicated. Moreover, the forward detection signal FDS can be adjusted in an analogous fashion thereby allowing the threshold temperature to be adjusted by shifting either RDS or FDS or both.

The multiplexer 33 includes a first and a second transfer gate 33a and 33b. The second transfer gate 33b is turned on when the control indication signal CINF is high, so that the second reverse voltage signal RSOS2 is provided to the controller 35. The first transfer gate 33a is turned on when the control indication signal CINF is low, so that a breaking voltage is provided to the controller 35. In the embodiment of FIG. 2, the breaking voltage is a power supply voltage VCC. It will be understood that other voltages may be used.

The controller 35 includes a plurality of PMOS transistors 35a_1, 35a_2, 35a_3, etc. and a plurality of control fuses 35b_1, 35b_2. 35b_3, etc. The PMOS transistors 35a_1, 35a_2, 35a_3, etc. are connected in parallel, and an output signal of the multiplexer 33 is applied to the gates of the plurality of PMOS transistors. The control fuses 35b_1, 35b_2, 35b_3, etc. are connected between drain ports of the PMOS transistors 35a_1, 35a_2, 35a_3, etc. and the reverse detection signal. The control fuses 35b_1, 35b_2, 35b_3, etc. can be cut externally such as by the application of a voltage level to a pin of the fabricated integrated circuit. It will be understood that the fuses may comprise other types of electrical components such as switches that can be reconfigured after the integrated circuit is fabricated.

When the control indication signal CINF is low, the power supply voltage VCC is applied to the gates of the PMOS transistors 35a_1, 35a_2, 35a_3, etc. Consequently, when the PMOS transistors 35a_1, 35a_2, 35a_3, etc. are turned off, the reverse detection signal is not shifted. When the control indication signal CINF is high, the second reverse voltage signal RSOS2 is provided to the gates of the PMOS transistors 35a_1, 35a_2, 35a_3, etc. Thus, voltages transferred through the PMOS transistors 35a_1, 35a_2, 35a__3, etc. are determined by the level of the second reverse level signal RSOS2. The control fuses 35b_1, 35b_2, 35b_3, etc. transfer the respective voltage levels transferred through the PMOS transistors 35a_1, 35a_2, 35a_3, etc. to the reverse detection signal so that the voltage level of the reverse detection signal RDS increases.

The control fuses 35b_1, 35b_2, 35b_3, etc. are cut to control the magnitude of the shift applied to the reverse detection signal RDS. For example, the first magnitude (T1 of FIG. 5) is determined by the number of control fuses 35b_1, 35b_2, 35b_3, etc. which are cut. In particular, the drains of the PMOS transistors 35a_1, 35a_2, 35a_3, etc. are connected to the reverse detection signal RDS via the control fuses 35b_1, 35b_2, 35b_3, etc. in advance. The threshold temperature, Tc, is adjusted by cutting the control fuses 35b_1, 35b_2, 35b_3, etc. Alternately, the control fuses 35b_1, 35b_2, 35b_3, etc. may comprise switches which can be set external to the fabricated integrated circuit.

Figure 3:
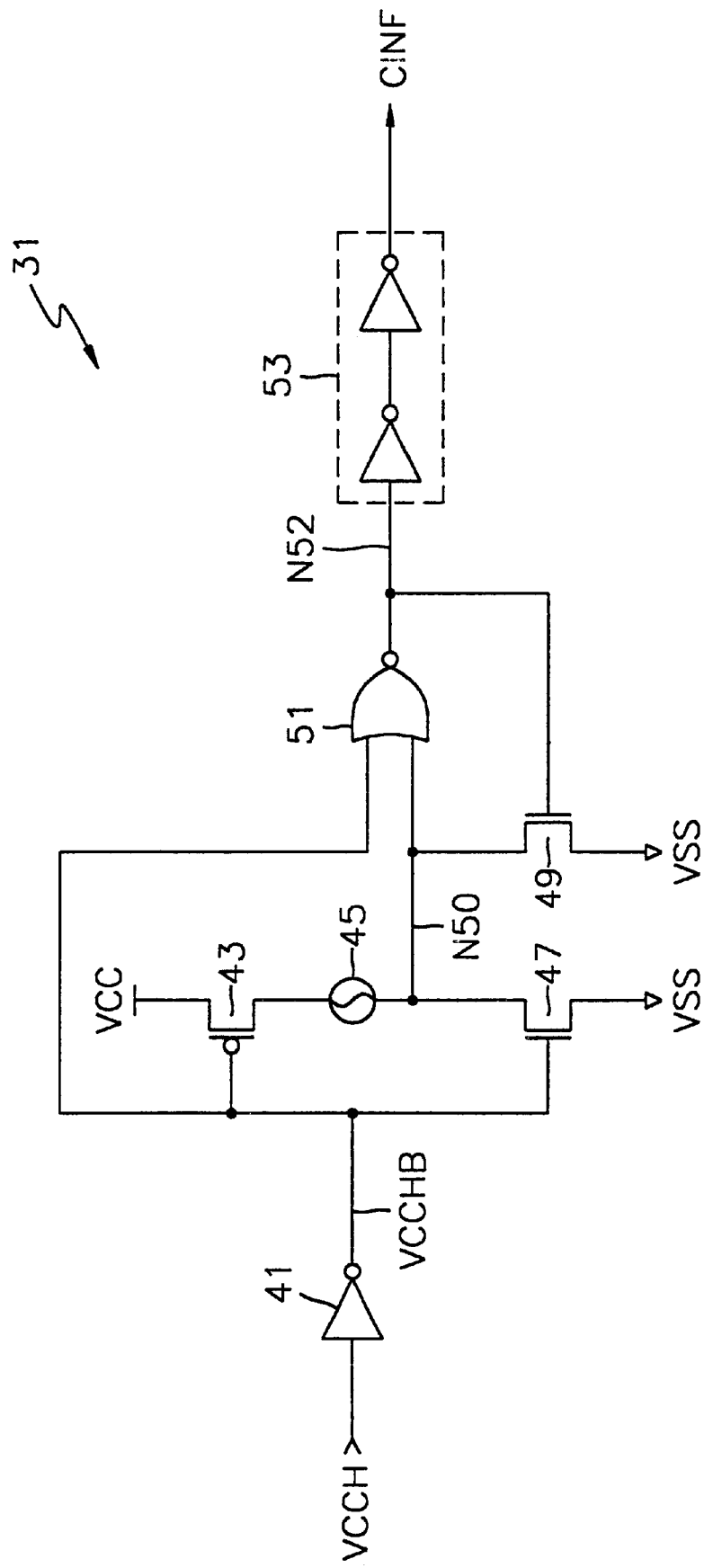
FIG. 3 is a circuit diagram of an embodiment of a control indicator shown in FIG. 2.
Figure 4:
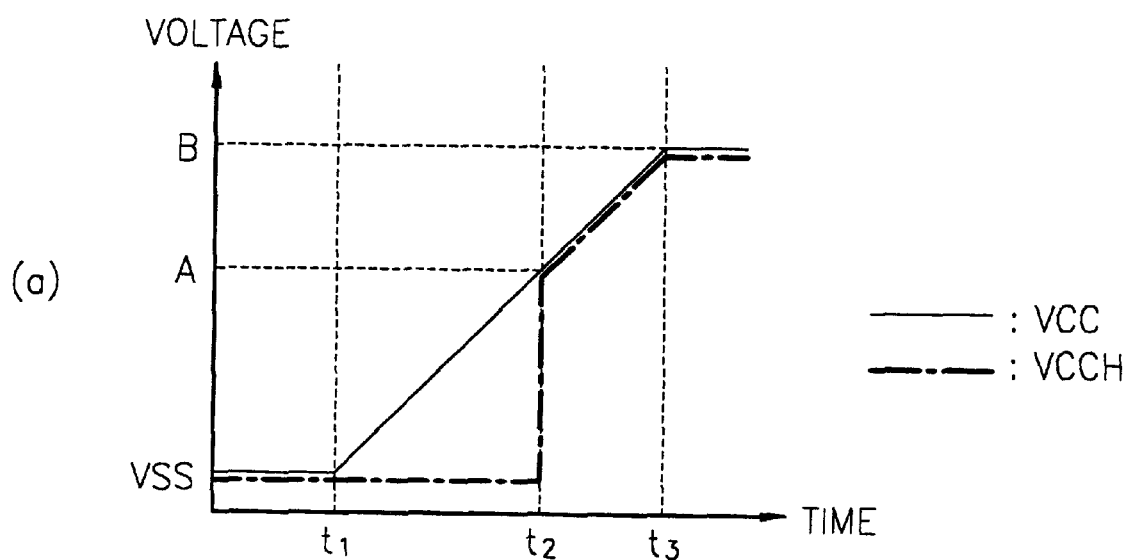
FIGS. 4A and 4B are graphs that illustrate changes in initial power supply voltage and the inverted power supply voltage signal according to the present invention.
Figure 4:
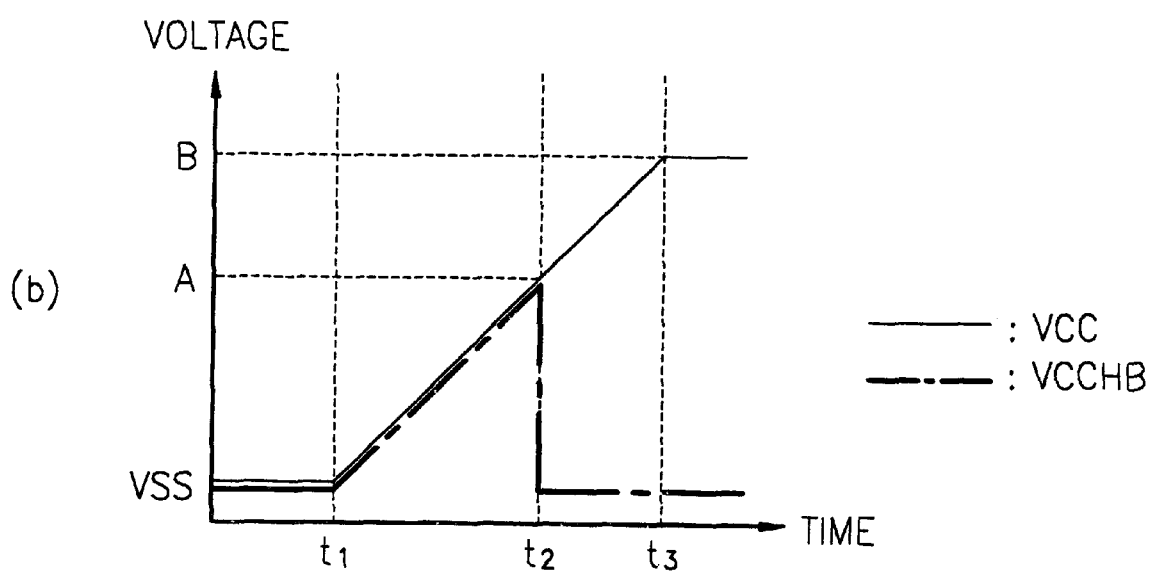

FIG. 3 is a circuit diagram of an embodiment of the control indicator 31 of FIG. 2. An inverter 41 inverts an initial power supply signal VCCH and outputs a power supply inversion signal VCCHB. In the case when the threshold temperature Tc remains constant, a control indicating fuse 45 is not cut. A power supply inversion signal VCCHB; as shown in FIG. 4, becomes stable at a low level, a PMOS transistor 43 is turned on to transfer the power supply voltage VCC. The control indicating fuse 45 transfers the power supply voltage VCC (a high level signal) transferred by the PMOS transistor 43 to an input port N50 of a NOR gate 51. The NOR gate 51 outputs a low level signal based on the high level signal at input port N50. A buffer 53 buffers and outputs the low level signal N52 of the NOR gate 51. Thus the control indication signal CINF is a low level.

When the threshold temperature Tc is adjusted, the control indicating fuse 45 is cut. A power supply inversion signal VCCHB, as shown in FIG. 4, is the same level as the power supply voltage VCC in the period between t1 and t2 which turns an NMOS transistor 47 on. Thus, the input N50 of the NOR gate 51 is at a low level. After a time t2, the inversion signal VCCHB is low which causes the output N52 of the NOR gate 51 to become high. The high output of the NOR gate 51 is latched by an NMOS transistor 49. Thereafter, the control indicating signal CINF is held at a high level. Therefore, the control indicating signal CINF is driven high by cutting the control indicating fuse 45 so that the threshold temperature Tc can be adjusted.

The second control circuit 27c has analogous structure and operation to that of the first control circuit 25c. However, the first and second control circuits 25c and 27c are different in that the input port IN of the first control circuit 25c is connected to the second reverse voltage signal RSOS2 and the output port OUT is connected to the forward detection signal while the input port IN of the second control circuit 27c is connected to the first reverse sourcing signal RSOS1 and the output port OUT thereof is connected to the reverse detection signal.

FIGS. 4A and 4B are graphs that illustrate changes in initial power supply signal VCCH and power supply inversion signal VCCHB, respectively, during an initial power-up stage which configures the CINF signal for operation of the control circuits 25c, 27c according to the present invention. When power supply VCC is initiated at time t1, the power supply voltage VCC gradually increases. Up to time t2, the initial power supply signal VCCH is kept at a ground voltage level VSS and the power supply inversion signal VCCHB increased to the same voltage level as the power supply voltage VCC. When the power supply voltage reaches a voltage level A, i.e., at a time t2, the voltage level of the initial power supply signal VCCH increases to be at the same voltage level as that of the power supply voltage VCC. The power supply inversion signal VCCHB is brought to the ground voltage VSS. At a time t3, the power supply voltage VCC and the initial power supply signal VCCH becomes stable at a voltage level B, and the power supply inversion signal VCCHB is kept at a level of the ground voltage VSS. Consequently, the CINF signal is latched to the state dependent upon whether the control indicator fuse is cut or uncut.

FIG. 5 is a graph that illustrates adjustment of the threshold temperature, Tc, according to the present invention. When the control indicating fuse (45 of FIG. 3) is not cut in the first and second control circuits 25c and 27c, the forward detection signal FDS and reverse detection signal RDS are indicated by lines F1 and R1, respectively. When the control indicating fuse 45 is cut in the control circuit 25c, the reverse detection signal RDS is shifted by a magnitude T1 to R2. Consequently, the threshold temperature is adjusted from α to β. The first magnitude T1 is determined by the number of control fuses 35b_1, 35b_2, 35b_3, etc. cut.

When the control indicating fuse 45 is cut from the controlling circuit 27c, the forward detection signal FDS is shifted by a second magnitude T2 from F1 to F2. Here, the threshold temperature Tc is shifted from a to γ. The second magnitude T2 is determined by the number of the control fuses in the second control circuit 27.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A temperature condition indicator in an integrated circuit comprising:
   a first current source that sources a first current in response to a temperature of the integrated circuit, wherein the first current increases in response to an increase in the temperature of the integrated circuit;
   a second current source that sources a second current in response to the temperature of the integrated circuit, wherein the second current decreases in response to an increase in the temperature of the integrated circuit;
   a programmable temperature detector, coupled to the first and second current sources, wherein the programmable temperature detector generates a first voltage signal in response to the first current and a plurality of switches and generates a second voltage signal in response to the second current and the plurality of switches, wherein the plurality of switches are set external to the integrated circuit; and
   a comparator, coupled to the programmable temperature detector, wherein the comparator compares the first and second voltage signals to provide a temperature state of the integrated circuit.

2. The temperature condition indicator of claim 1, wherein the comparator provides a first temperature state of the integrated circuit when the first voltage signal exceeds the second voltage signal and provides a second temperature state of the integrated circuit when the second voltage signal exceeds the first voltage signal.

3. A temperature condition indicator in an integrated circuit comprising:
   a first current source that sources a first current in response to a temperature of the integrated circuit, wherein the first current increases in response to an increase in the temperature of the integrated circuit;
   a second current source that sources a second current in response to the temperature of the integrated circuit, wherein the second current decreases in response to an increase in the temperature of the integrated circuit;
   a programmable temperature detector, coupled to the first and second current sources, wherein the programmable temperature detector generates a first voltage signal in response to the first current. and a plurality of switches and generates a second voltage signal in response to the second current and Ale plurality of switches, wherein the plurality of switches are set external to the integrated circuit;
   a comparator, coupled to the programmable temperature detector, wherein the comparator compares the first and second voltage signals tc provide a temperature state of the integrated circuit; and
   wherein the programmable temperature detector comprises:
      a first current mirror that generates a first forward voltage signal and a first reverse voltage signal, wherein the first forward voltage signal increases and the first reverse voltage signal decreases in response to an increase in the first current;
      a second current mirror that generates a second forward voltage signal and a second reverse voltage signal, wherein the second forward voltage signal increases and the second reverse voltage signal decreases in response to an increase in the second current;
      a first response circuit, coupled to the first current mirror, wherein the first responding circuit generates the second voltage signal based on the first forward voltage signal and the second reverse voltage signal; and
      a second response circuit, coupled to the second current mirror, wherein the second responding circuit generates the first voltage signal based on the first reverse voltage signal and the second forward voltage signal.

4. The temperature condition indicator of claim 3, wherein the first response circuit comprises:
   a pull-down transistor that decreases the second voltage signal in response to an increase in the first forward voltage signal;
   a pull-up transistor that increases the second voltage signal in response to a decrease in the second reverse voltage signal; and
   a control circuit, coupled to the pull-up transistor and the pull-down transistor, wherein the control circuit adjusts the second voltage signal by a magnitude controlled external to the integrated circuit.

5. The temperature condition indicator of claim 4, wherein the control circuit comprises:
   a multiplexor that selects the second reverse voltage signal or a breaking voltage level based on a control signal; and
   a controller, coupled to the multiplexor, that provides the second voltage signal in response to the selection of the second reverse voltage signal by the multiplexor.

6. The temperature condition indicator of claim 5, wherein the controller comprises:
   a plurality of p-type metal oxide semiconductor (PMOS) transistors, wherein the plurality of PMOS transistors select a power supply voltage in response to the second reverse voltage signal selected by the multiplexor; and
   a plurality of fuses, coupled to the plurality of PMOS transistors, that couple the power supply voltage to the second reverse voltage signal selected by the multiplexor to change the second voltage signal by the magnitude selected by cutting selected ones of the plurality of fuses.

7. The temperature condition indicator of claim 3, wherein the second response circuit comprises:
   a pull-down transistor that decreases the first voltage signal in response to an increase in the second forward voltage signal;
   a pull-up transistor that increases the first voltage signal in response to a decrease in the first reverse voltage signal; and
   a control circuit, coupled to the pull-up transistor and the pull-down transistor, wherein the control circuit adjusts the first voltage signal by a magnitude controlled external to the integrated circuit.

8. The temperature condition indicator of claim 7, wherein the control circuit comprises:
   a multiplexor that selects the first reverse voltage signal or a breaking voltage level based on a control signal; and
   a controller, coupled to the multiplexor, that provides the first voltage signal in response to the selection of the first reverse voltage signal by the multiplexor.

9. The temperature condition indicator indictator of claim 8, wherein the controller comprises:
   a plurality of p-type metal oxide semiconductor (PMOS) transistors, wherein the plurality of PMOS transistors select a power supply voltage in response to the first reverse voltage signal selected by the multiplexor; and
   a plurality of fuses, coupled to the plurality of PMOS transistors, that couple the power supply voltage to the first reverse voltage signal selected by the multiplexor to change the first voltage signal by the magnitude selected by cutting selected ones of the plurality of fuses.

* * * * *

UNITED STATES PATENT AND TRADEMARK OFFICE
CERTIFICATE OF CORRECTION

PATENT NO. : 6,442,500 B1
DATED : August 27, 2002
INVENTOR(S) : Kim

It is certified that error appears in the above-identified patent and that said Letters Patent is hereby corrected as shown below:

Column 2,
Line 16, should read as follows:  -- integrated circuit is packaged, by a test mode or an electrical --
Line 18, the following paragraph was deleted and should read be included as follows:
    -- In a further aspect of the present invention, the variable threshold temperature is adjusted by selecting one of a plurality of first switch settings in the fabricated integrated circuit, wherein the plurality of first switch settings correspond to an associated plurality of threshold temperatures.  The threshold temperature may be adjusted by setting the switches in one of the plurality of switch settings after the integrated circuit is packaged. --

Column 8,
Line 27, should read as follows: -- response to the first current and a plurality of switches --
Line 29, should read as follows:  -- second current and the plurality of switches, wherein --

Signed and Sealed this

Twenty-ninth Day of April, 2003

JAMES E. ROGAN
*Director of the United States Patent and Trademark Office*